United States Patent
Satou et al.

(10) Patent No.: US 8,781,777 B2
(45) Date of Patent: Jul. 15, 2014

(54) ROTATION ANGLE DETECTION DEVICE AND ELECTRIC POWER STEERING SYSTEM USING THE SAME

(75) Inventors: Takafumi Satou, Okazaki (JP); Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 238 days.

(21) Appl. No.: 13/199,947

(22) Filed: Sep. 13, 2011

(65) Prior Publication Data

US 2012/0078560 A1    Mar. 29, 2012

(30) Foreign Application Priority Data

Sep. 23, 2010 (JP) ................................. 2010-212909

(51) Int. Cl.
*G01C 17/38*    (2006.01)
*B62D 15/02*    (2006.01)
*G01D 5/244*    (2006.01)

(52) U.S. Cl.
CPC .......... *B62D 15/0235* (2013.01); *G01D 5/2449* (2013.01)
USPC ............. 702/94; 702/104; 702/106; 702/150; 702/151; 702/189; 73/862.325

(58) Field of Classification Search
USPC ........ 702/94, 106, 150, 151, 189; 73/862.325
See application file for complete search history.

(56) References Cited

U.S. PATENT DOCUMENTS

| | | | | |
|---|---|---|---|---|
| 4,490,914 A | * | 1/1985 | Spies .............................. | 33/700 |
| 5,239,490 A | * | 8/1993 | Masaki et al. .................. | 702/41 |
| 5,732,109 A | * | 3/1998 | Takahashi ...................... | 375/326 |
| 5,796,231 A | * | 8/1998 | Kyodo ........................... | 318/608 |
| 6,188,341 B1 | | 2/2001 | Taniguchi et al. | |
| 6,340,908 B1 | * | 1/2002 | Matuyama ..................... | 327/238 |
| 7,714,570 B2 | * | 5/2010 | Thomas et al. ............. | 324/207.2 |
| 2002/0171418 A1 | * | 11/2002 | Hinz et al. ................ | 324/207.22 |
| 2004/0207392 A1 | * | 10/2004 | Kernhof .................... | 324/207.25 |
| 2005/0135035 A1 | * | 6/2005 | Tsutsui ........................ | 361/93.1 |
| 2005/0242802 A1 | * | 11/2005 | Matsumoto et al. .......... | 324/174 |
| 2006/0012328 A1 | * | 1/2006 | Yasukawa et al. ............ | 318/719 |
| 2006/0132338 A1 | * | 6/2006 | Katakura et al. ............. | 341/112 |
| 2006/0136169 A1 | * | 6/2006 | Shonai et al. ................. | 702/145 |

(Continued)

FOREIGN PATENT DOCUMENTS

| EP | 0652419 A1 | * | 5/1995 | ......... G01D 5/24452 |
|---|---|---|---|---|
| EP | 1 544 579 | | 6/2005 | |

(Continued)

OTHER PUBLICATIONS

Office Action dated Jul. 3, 2012 in corresponding Japanese Application No. 2010-212909 with English translation.

*Primary Examiner* — Hyun Park
(74) *Attorney, Agent, or Firm* — Harness, Dickey & Pierce, PLC (57) ABSTRACT

A bridge circuit includes a plurality of half-bridges formed of sensor elements, which change impedance in accordance with a rotation angle of a detection target. A control circuit acquires output signals of the half-bridges and calculates a phase correction value for correcting a phase deviation. A memory circuit stores the phase correction value. The control circuit corrects a pre-correction rotation angle by the phase correction value. Since the pre-correction rotation angle is corrected by the phase correction value, a rotation angle of the detection target is detected with high accuracy even if the sensor elements are assembled with some positional deviations.

7 Claims, 6 Drawing Sheets

(56) References Cited

U.S. PATENT DOCUMENTS

2008/0143325 A1  6/2008  Sano
2008/0315809 A1* 12/2008 Tamaizumi ............. 318/400.23
2009/0206827 A1*  8/2009 Aimuta et al. ........... 324/207.25

FOREIGN PATENT DOCUMENTS

| | | |
|---|---|---|
| JP | 2006-194861 | 7/2006 |
| JP | 2008-128962 | 6/2008 |
| WO | WO 98/21553 | 5/1998 |

* cited by examiner

| AREA | θn | \|Vadn\| VS. \|Vsdn\| | SIGN OF Vadn | SIGN OF Vsdn | γn-CALCULATION | θn-CALCULATION |
|---|---|---|---|---|---|---|
| 1 | 0 ≤ θn ≤ 45 | \|Vadn\| ≤ \|Vsdn\| | ≥0 | ≥0 | tan | γn |
| 2 | 45 < θn ≤ 90 | \|Vadn\| > \|Vsdn\| | ≥0 | ≥0 | cot | 90−γn |
| 3 | 90 < θn ≤ 135 | \|Vadn\| > \|Vsdn\| | ≥0 | <0 | cot | 90+γn |
| 4 | 135 < θn ≤ 180 | \|Vadn\| ≤ \|Vsdn\| | ≥0 | <0 | tan | 180−γn |
| 5 | 180 < θn ≤ 225 | \|Vadn\| ≤ \|Vsdn\| | <0 | <0 | tan | 180+γn |
| 6 | 225 < θn ≤ 270 | \|Vadn\| > \|Vsdn\| | <0 | <0 | cot | 270−γn |
| 7 | 270 < θn ≤ 315 | \|Vadn\| > \|Vsdn\| | <0 | ≥0 | cot | 270+γn |
| 8 | 315 < θn < 360 | \|Vadn\| ≤ \|Vsdn\| | <0 | ≥0 | tan | 360−γn |

ROTATION ANGLE DETECTION DEVICE AND ELECTRIC POWER STEERING SYSTEM USING THE SAME

CROSS REFERENCE TO RELATED APPLICATION

This application is based on and incorporates herein by reference Japanese patent application No. 2010-212909 filed on Sep. 23, 2010.

FIELD OF THE INVENTION

The present invention relates to a rotation angle detection device for detecting a rotation angle of a rotary member and an electric power steering apparatus using the same.

BACKGROUND OF THE INVENTION

A conventional rotation angle detection device, which detects a rotation angle of a rotary member, calculates a rotation angle based on output signals produced by sensor elements. In case that the output signals are a cosine signal and a sine signal, for example, it is required that the cosine signal and the sine signal produced from the sensor elements have a phase difference of 90°. The sensor element for producing the cosine signal and the sensor element for producing the sine signal need be arranged such that the directions of magnetization of the sensor elements are shifted 90°. However, since the direction of magnetization cannot be confirmed visually, it is hard to arrange the sensor elements such that respective directions of magnetization shift 90° exactly. It is therefore proposed in the patent document (JP 4194484, EP 1544579A1) to accurately calculate a rotation angle δ by correcting deviation of arrangement of the sensor elements by subtracting an approximation of trigonometric function from a rotation angle θ detected without phase correction.

According to the patent document, it is required to measure a correct rotation angle δ from an external side in calculating an approximation of a trigonometric function, which is used to correct phase. It is therefore necessary in the patent document to provide an external device for measuring the rotation angle δ. According to the patent document, in case that the number of signals used in calculating the rotation angle increases, it is required to store as many trigonometric functions as the number of combinations of the signals. Thus, storage capacity of a memory will correspondingly increase.

SUMMARY OF THE INVENTION

It is an object of the present invention to provide a rotation angle detection device for detecting a rotation angle of a detection target with high precision and an electric power steering apparatus using the same.

According to one aspect of the present invention, a rotation angle detection device comprises a sensor circuit, a control circuit and a memory circuit. The sensor circuit includes a plurality of sensor element pairs, each of which is formed of sensor elements and senses a rotating magnetic field varying with rotation of a detection target and changes impedance in accordance with a rotation angle of the detection target. The control circuit includes an output signal acquisition section for acquiring output signals produced by the plurality of sensor element pairs individually, a pre-correction rotation angle calculation section for calculating a pre-correction rotation angle of the detection target based on the output signals acquired by the output signal acquisition section, and a correction section for correcting the pre-correction rotation angle calculated by the pre-correction rotation angle calculation section by correction values. The memory circuit stores correction values.

The control circuit further includes a phase correction value calculation section for calculating phase correction values, as the correction values, for correcting phase deviations between the output signals based on the output signals acquired by the output signal acquisition section. The correction section corrects the pre-correction rotation angle by the phase correction values stored in the memory circuit. The output signal acquisition section acquires the output signals, which are a plurality of signals of different phases.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT (First Embodiment)

Figure 1:
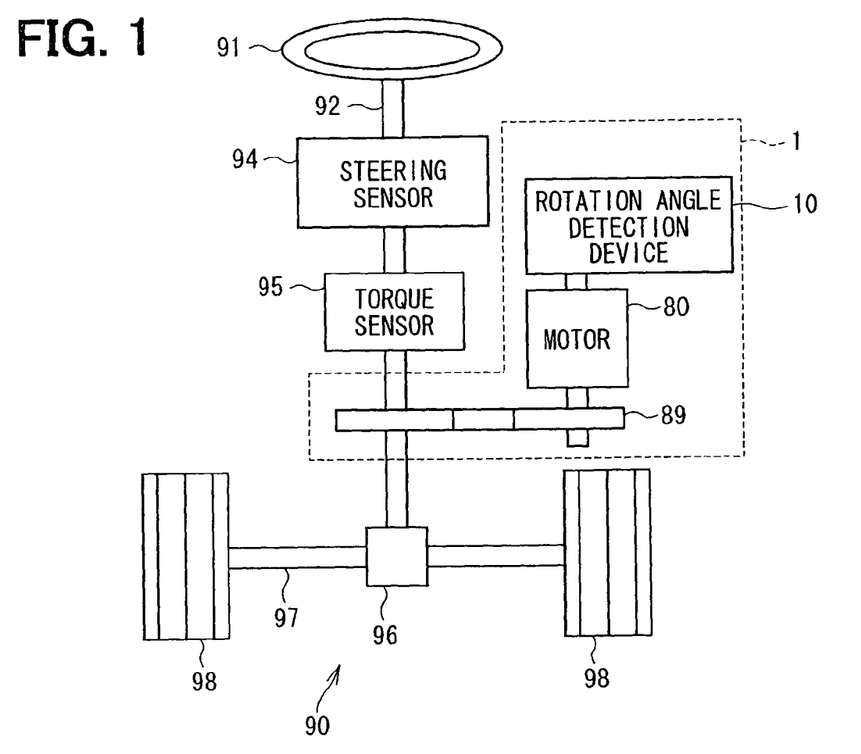
FIG. 1 is a schematic diagram showing a steering system, which uses a rotation angle detection device according to one embodiment of the present invention.

Referring to FIG. 1, a rotation angle detection device 10 is provided in an electric power steering system (EPS) 1, which power-assists a steering operation in a vehicle.

The electric power steering system 1 forms a part of a steering system 90 of a vehicle, which has a steering wheel 91 and a steering shaft 92 coupled to the steering wheel 91. A steering sensor 94 and a torque sensor 95 are attached to the steering shaft 92. The steering sensor 94 detects a rotation angle (angular position in rotation) of the steering shaft 92. The torque sensor 95 detects a steering torque applied to the steering wheel 91. The end of the steering shaft 92 is coupled to a rack shaft 97 through a gear set 96. A pair of tires (vehicle wheels) 98 is coupled to both ends of the rack shaft 97 through rods and the like. Rotary motion of the steering shaft 92 is converted into linear motion of the rack shaft 97 by the gear set 96. The tires 98 are steered by an amount corresponding to the amount of linear movement of the rack shaft 97.

The electric power steering system 1 includes an electric motor 80 for generating steering assist torque, a rotation angle detector (detection device) 10 for detecting a rotational angular position of the motor 80, and gears 89 for transferring rotation of the motor 80 to the steering shaft 92 in reduced rotation. The motor is a three-phase brushless motor, which rotates the gears in both forward and reverse directions. The electric power steering system 1 transfers the steering assist torque to the steering shaft 92 in correspondence to the steering direction and steering torque of the steering wheel 91.

Figure 2:
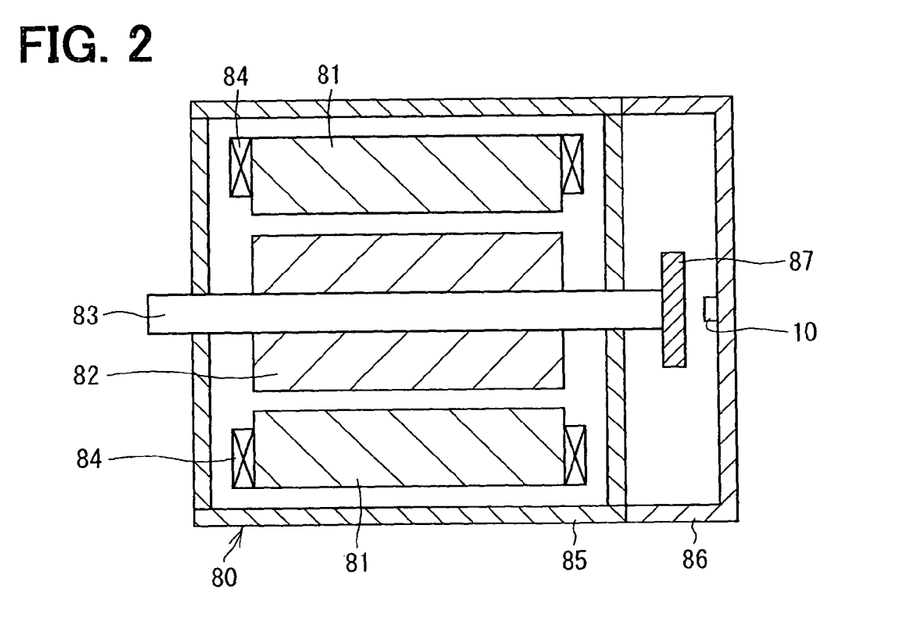
FIG. 2 is a schematic sectional view showing a motor, which is used in the steering system shown in FIG. 1.

As shown in FIG. 2 schematically, the motor 80 includes a stator 81, a rotor 82, a shaft 83 and the like. The rotor 82 is a cylindrical body, which rotates with the shaft 83. The rotor 82 has permanent magnets on its cylindrical surface and magnetic poles. The rotor 82 is provided radially inside the stator 81 and supported rotatably therein. The stator 81 has protrusions, which protrude in a radially inward direction and provided at a predetermined angular interval in a circumferential direction. Coils 84 are wound about the protrusions. The rotor 82 rotates with the shaft 83 and generates rotating magnetic fields, when currents are supplied to the coils 84 of the stator 81. The stator 81, the rotor 82, the shaft 83 and the coils 84 are accommodated within a housing 85. The shaft 83 protrudes outward from both axial ends of the housing 85 and has a detection target 87 at one of its axial ends. The detection target 87 is a target to be detected by the rotation detection device 10 and accommodated within a cover 86. The detection target 87 is a two-pole magnet formed in a disk shape and rotates with the shaft 83. The rotation angle detection device 10 is attached to the cover 86 at a position that faces the detection target 87. In place of one rotation angle detection device 10, a plurality of rotation angle detection devices may be provided on the cover 86. The rotation angle of the detection target 87 indicates the rotation angle of the shaft 83 of the motor 80.

Figure 3:
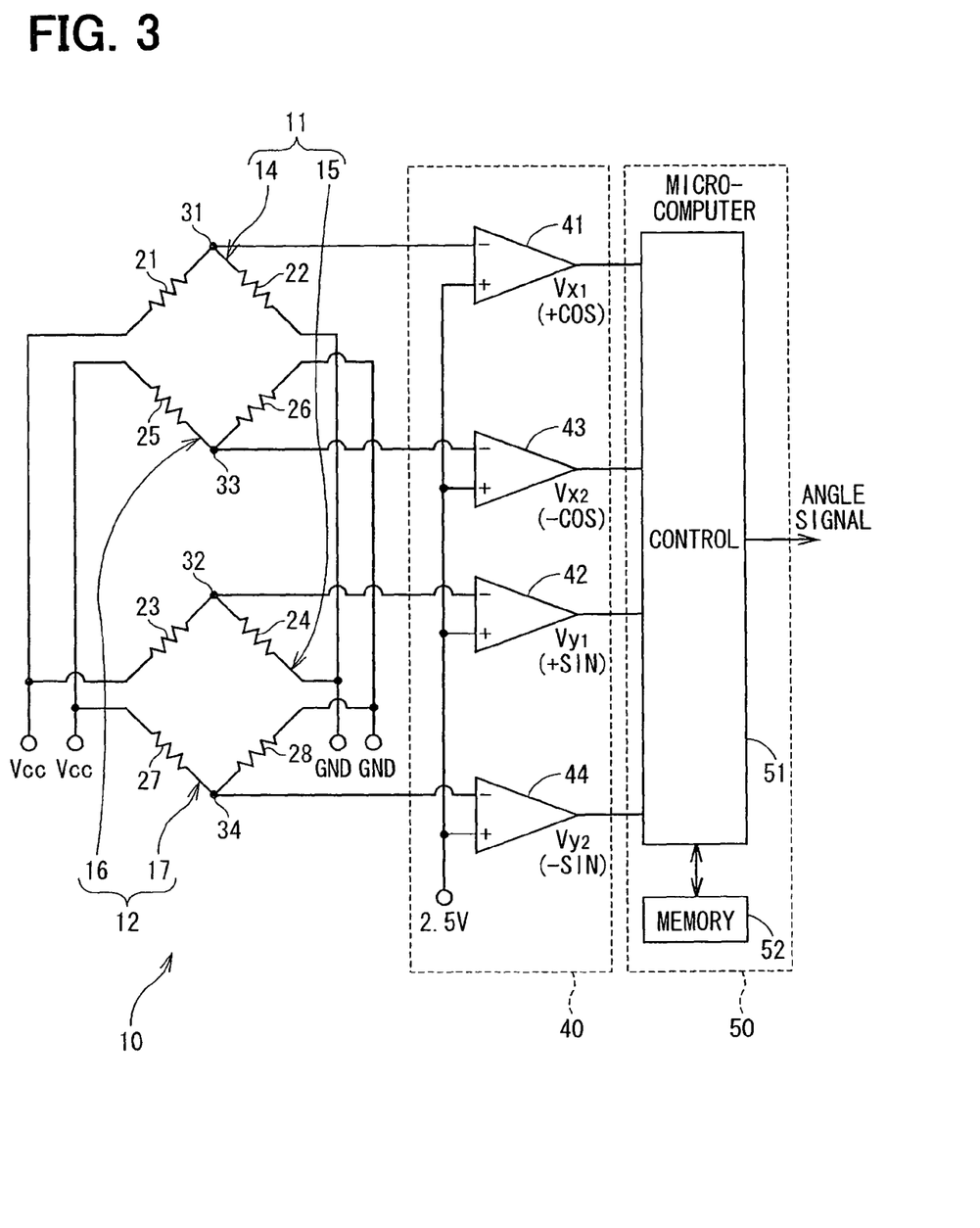
FIG. 3 is a circuit diagram showing the rotation angle detection device according to the embodiment of the present invention.

The rotation angle detection device 10 is configured as shown in FIG. 3. The rotation detection device 10 has a first bridge circuit 11, a second bridge circuit 12, an amplifier circuit 40, a microcomputer 50 and the like. The first bridge circuit 11 and the second bridge circuit 12 form a circuit part. The first bridge circuit 11 has a first half-bridge 14 and a second half-bridge 15 connected in parallel. The first half-bridge 14 is formed of two sensor elements 21 and 22 connected in series. A junction 31 between the sensor elements 21 and 22 is connected to a first operational amplifier 41 of the amplifier circuit 40. The second half-bridge 15 is formed of two sensor elements 23 and 24 connected in series. A junction 32 between the sensor elements 23 and 24 is connected to a second operational amplifier 42 of the amplifier circuit 40. The second bridge circuit 12 has a third half-bridge 16 and a fourth half-bridge 17 connected in parallel. The third half-bridge 16 is formed of two sensor elements 25 and 26 connected in series. A junction 33 between the sensor elements 25 and 26 is connected to a third operational amplifier 43 of the amplifier circuit 40. The fourth half-bridge 17 is formed of two sensor elements 27 and 28 connected in series. A junction 34 between the sensor elements 27 and 28 is connected to a fourth operational amplifier 44 of the amplifier circuit 40.

The sensor elements 21 to 28 are all magneto-resistive elements. Each magneto-resistive element varies its impedance in correspondence to rotating magnetic field, which varies with rotation of the detection target 87. The magneto-resistive element is preferably a GMR element, for example. Each of the half-bridges 14 to 17 is a sensor element pair. The sensor element pair, which produces one signal, is referred to as a half-bridge. However, the number of sensor element pairs, which form a bridge circuit, is not limited to two. Further, the number of sensor elements, which form a sensor element pair, is not limited to two.

The sensor elements 21 to 28 are arranged so that the direction of magnetization of the first half-bridge 14 and the third half-bridge 16 is shifted about 90° from the direction of magnetization of the second half-bridge 15 and the third half-bridge 17. The cosine signals are produced at the junction 31 of the first half-bridge 14 and the junction 33 of the third half-bridge 16, and the sine signals are produced at the junction 32 of the second half-bridge 15 and the junction 34 of the fourth half-bridge 17.

The first bridge circuit 11, which is formed of the first half-bridge 14 producing the cosine signal and the second half-bridge 15 producing the sine signal, and the second bridge circuit 12, which is formed of the third half-bridge 16 producing the cosine signal and the fourth half-bridge 17 producing the sine signal, are connected to different power sources of the same power supply voltage Vcc. Thus, even if one of the bridge circuits 11 and 12 fails, the rotation angle δ of the detection target 87 can be continuously calculated by using the cosine signal and the sine signal produced from the other bridge circuit.

The amplifier circuit 40 is formed of the first amplifier 41, the second amplifier 42, the third amplifier 43 and the fourth amplifier 44. The first amplifier 41 amplifies the cosine signal produced at the junction 31 of the first half-bridge 14 and applies its output signal Vx1, which is a positive cosine signal (+cos) to the microcomputer 50. The second amplifier 42 amplifies the signal produced at the junction 32 of the second half-bridge 15 and applies its output signal Vy1, which is a positive sine signal (+sin) to the microcomputer 50. The third amplifier 43 amplifies the signal produced at the junction 33 of the third half-bridge 16 and applies its output signal Vx2, which is a negative cosine signal (−cos) to the microcomputer 50. The fourth amplifier 44 amplifies the signal produced at the junction 34 of the fourth half-bridge 17 and applies its output signal Vy2, which is a negative sine signal (−sin) to the microcomputer 50.

In case that the power source voltage Vcc supplied to the rotation angle detection device 10 is 5V, the four output signals Vx1, Vx2, Vy1 and Vy2 are expressed by the following equations (1) to (4).

$$Vx1 = \cos \delta + 2.5 \tag{1}$$

$$Vx2 = -\cos \delta + 2.5 \tag{2}$$

$$Vy1 = \sin \delta + 2.5 \tag{3}$$

$$Vy2 = -\sin \delta + 2.5 \tag{4}$$

The output signals Vx1 and Vx2, which are cosine signals, may often be referred to as +cosine signal Vx1 and −cosine signal Vx2, respectively. Similarly, the output signals Vy1 and Vy2, which are sine signals, may often be referred to as +sine signal Vy1 and −sine signal Vy2, respectively.

The microcomputer 50 includes a control circuit (CPU, etc.) 51 and a memory circuit (memories, etc.) 52. The control circuit 51 performs a variety of calculation processing including phase correction value calculation processing, pre-correction rotation angle calculation processing, correction processing and the like. The memory circuit 52 is provided to store the phase correction values and the like calculated by the control circuit 51. The output signals produced from the junctions 31 to 34 of the half-bridges 14 to 17 are inputted to the control circuit 51 after being individually amplified in the amplifier circuit 40. That is, the output signal of one half-bridge is not subjected to processing of addition, differential amplification and the like with any of the output signals of the other half-bridges before being inputted to the control circuit 51.

Figure 4:
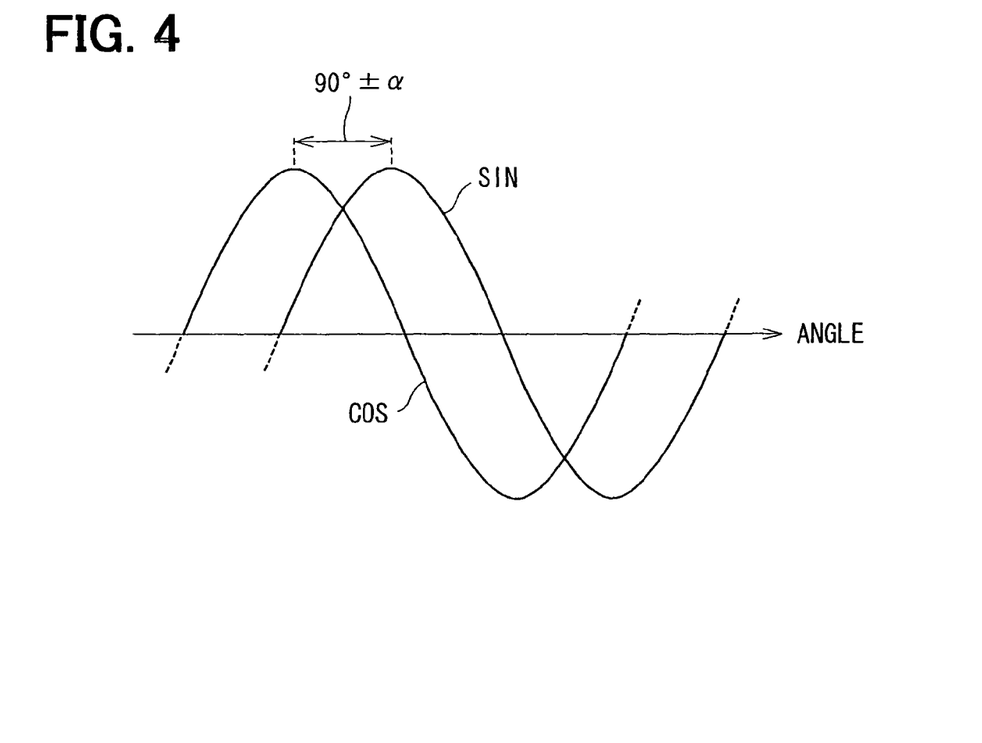
FIG. 4 is a signal diagram showing a cosine signal and a sine signal used in the embodiment of the present invention.

Here, the cosine signal and the sine signal will be described with reference to FIG. 4. In FIG. 4, one cycle of each of a cosine signal (COS) and a sine signal (SIN) is shown. The sensor elements 21 to 28 are arranged so that the direction of magnetization of the first half-bridge 14 and the third half-bridge 16 is shifted 90° from the direction of magnetization of the second half-bridge 15 and the fourth half-bridge 17. As a result, the cosine signals produced from the first half-bridge 14 and the third half-bridge 16 differ from the sine signals produced from the second half-bridge 15 and the fourth half-bridge 17 by 90° in phase. However, since the direction of magnetization cannot be confirmed visually, it is hard to arrange so that the direction of magnetization of the first half-bridge 41 and the third half-bridge 16 crosses the direction of magnetization of the second half-bridge 15 and the fourth half-bridge 17 with exactly 90°.

Therefore, the difference in phase between the cosine signal and the sine signal is actually about 90°, that is, 90±α°, as indicated in FIG. 4. In the following description, the cosine signal is assumed to be a reference signal, and a difference α, which is determined to be a value by subtracting 90 from the difference in phase between the cosine signal and the sine signal, is referred to as a phase deviation. For example, if the phase difference between the cosine signal and the sine signal is 89°, the phase deviation α is −1°. If the phase difference between the cosine signal and the sine signal is 91°, the phase deviation α is +1°.

A phase correction value φ, which is provided to correct the phase deviation α is calculated based on the output signals Vx1, Vx2, Vy1 and Vy2. Here, phase correction value calculation processing for calculating the phase correction value φ will be described with reference to a flowchart shown in FIG. 5. This phase correction value calculation processing is performed before rotation angle detection processing, which is performed in driving the electric power steering (EPS) apparatus 1 and shown in FIG. 6 and FIG. 7. It is performed, for example, when the rotation angle detection device 10 is assembled to the motor 80.

Figure 5:
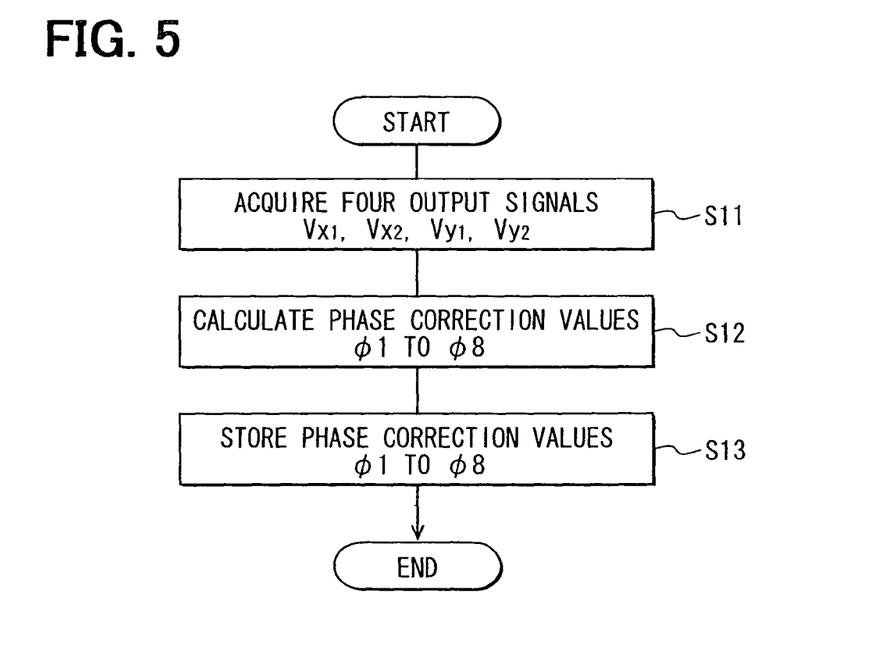
FIG. 5 is a flowchart showing phase correction value calculation processing performed in the embodiment of the present invention.

At first step S11 (hereinafter step is simply denoted by S), the four output signals Vx1, Vx2, Vy1 and Vy2 are acquired. The output signals Vx1, Vx2, Vy1 and Vy2 vary in correspondence to rotation of the detection target 87 and are acquired for a period of at least one cycle.

The detection target 87 may be rotated by current supply to the coils 84 or manually. The cosine signal Vx and the sine signal Vy are calculated by subtraction between cosine signals and between sine signals, respectively. The cosine signal Vx and the sine signal Vy are expressed by the following equations (5) and (6). By subtraction between the cosine signals Vx1 and Vx2 and the sine signals Vy1 and Vy2, sensor error caused by temperature characteristic and the like is cancelled out.

$$Vx = Vx1 - Vx2 = 2\cos\delta \quad (5)$$

$$Vy = Vy1 - Vy2 = 2\sin\delta \quad (6)$$

At S12, the phase correction value φ for correcting the phase deviation α is calculated based on the output signals Vx1, Vx2, Vy1 and Vy2 acquired at S11 and the cosine signal Vx and the sine signal Vy calculated at S11.

Nine phase correction values φ0 to φ8 are calculates as constants for different combinations of signals. The phase correction values φ0 to φ8 are calculated in a manner described below. It is preferred that the phase correction value φ is calculated for each combination of signals in accordance with the number of acquired signals. At S13, the phase correction values φ0 to φ8 calculated at S12 are stored in the memory circuit 52. Thus this processing is finished.

The phase correction values φ0 to φ8 are calculated as follows.

<Phase Correction Value φ0>

The phase correction value φ0 is calculated based on the cosine signal Vx and the sine signal Vy, which are free from sensor errors. Assuming that the phase deviation between the cosine signal Vx and the sine signal Vy with the cosine signal Vx being the reference is α0, the cosine signal Vx and the sine signal Vy are expressed as follows.

$$Vx = 2\cos\delta \quad (5)$$

$$Vy = 2\sin(\delta + \alpha 0) \quad (7)$$

The phase correction value φ0 is calculated as follows by using the cosine signal Vx expressed by equation (5) and the sine signal Vy expressed by equation (7). First, a subtraction value Vs0 is calculated by subtracting the sine signal Vy from the cosine signal Vx. The subtraction value Vs0 is expressed by the following equation (8).

$$Vs0 = Vx - Vy = 2\cos\delta - 2\sin(\delta + \alpha 0) = 2\{\cos\delta + \cos(\delta + 90 + \alpha 0)\} \quad (8)$$

By transforming equation (8) by the product formula (9), the subtraction value Vs0 is expressed by the following equation (10).

$$\cos A + \cos B = 2\cos\{(A+B)/2\}\cos\{(A-B)/2\} \quad (9)$$

$$\begin{aligned}Vs0 &= 2\{\cos\delta + \cos(\delta + 90 + a0)\} \\ &= 4\cos\{(\delta + \delta + 90 + a0)/2\} \times \cos[\{\delta - (\delta + 90 + a0)\}/2] \\ &= 4\cos(\delta + 45 + a0/2)\cos\{-(45 + a0/2)\} \\ &= 4\cos(\delta + 45 + a0/2)\cos(45 + a0/2)\end{aligned} \quad (10)$$

Further, an addition value (sum) Va0 is calculated by adding the sine signal Vy to the cosine signal Vx. The addition value Va0 is expressed by the following equation (11).

$$Va0 = Vx + Vy = 2\cos\delta + 2\sin(\delta + \alpha 0) = 2\{\cos\delta - \cos(\delta + 90 + \alpha 0)\} \quad (11)$$

By transforming the equation (11) by the product formula, the addition value Va0 is expressed by the following equation (13).

$$\cos A - \cos B = -2\sin\{(A+B)/2\}\sin\{(A-B)/2\} \quad (12)$$

$$\begin{aligned}Va0 &= 2\{\cos\delta - \cos(\delta + 90 + a0)\} \\ &= -4\cos\{(\delta + \delta + 90 + a0)/2\} \times \\ &\quad \sin[\{\delta - (\delta + 90 + a0)\}/2] \\ &= -4\sin(\delta + 45 + a0/2)\sin\{-(45 + a0/2)\} \\ &= 4\sin(\delta + 45 + a0/2)\sin(45 + a0/2)\end{aligned} \quad (13)$$

The maximum value Vs0max of the subtraction value Vs0 and the maximum value Va0max of the addition value Va0 are expressed by the following equations (14) and (15), respectively.

$$Vs0\max = 4\cos\{(45 + \alpha 0/2)\} \quad (14)$$

$$Va0\max = 4\sin\{(45 + \alpha 0/2)\} \quad (15)$$

The maximum value Vs0max of the subtraction value Vs0 and the maximum value Va0max of the addition value Va0 may be acquired as constants by rotating the detection target 87.

The arctangent (ATAN) of a quotient, which is calculated by dividing the maximum value Va0max of the addition value Va0 by the maximum value Vs0max of the subtraction value Vs0, is calculated as the phase correction value φ0 as expressed by the following equation (16).

$$\varphi 0 = ATAN(Va0\mathrm{max}/Vs0\mathrm{max}) \quad (16)$$
$$= ATAN[4\sin\{(45 + a0/2)\}/4\cos\{(45 + a0/2)\}]$$
$$= 45 + a0/2$$

As described above, since the maximum value Vs0max of the subtraction value Vs0 and the maximum value Va0max of the addition value Va0 are constants, the phase correction value φ0 is calculated also as a constant.

The phase correction value φ0 is calculated as described above by using the cosine signal Vx and the sine signal Vy. The other phase correction values φ1 to φ8 are calculated in the similar manner by using other cosine signals and other sine signals as described with reference to the equations (8) to (16). The phase correction values φ1 to φ8 are described further.

<Phase Correction Value φ1>

The phase correction value φ1 is calculated based on the −cosine signal Vx2 and the sine signal Vy. Assuming that the phase deviation is α1 with the −cosine signal Vx2 being the reference, the −cosine signal Vx2 and the sine signal Vy are expressed as follows. The −cosine signal Vx2 is subjected to cancellation of an offset value in the control circuit 51 and is converted to the +cosine signal, that is, −Vx2a.

$$Vx2a=-\cos\delta-Vx2a=\cos\delta \quad (17)$$

$$Vy=2\sin(\delta+\alpha 1) \quad (18)$$

A subtraction value Vs1 is calculated by subtracting the sine signal Vy from the cosine signal −Vx2a. In this example, the cosine signal −Vx2a is doubled so that the amplitude of the cosine signal −Vx2a and the amplitude of the sine signal Vy equal. However, the sine signal Vy may be halved. This is also true for other examples to follow.

$$Vs1=-2Vx2a-Vy=2\cos\delta-2\sin(\delta+\alpha 1)=2\{\cos\delta+\cos(\delta+90+\alpha 1)\} \quad (19)$$

By transforming the equation (19) by the product formula, the subtraction value Vs1 is expressed by the following equation (20).

$$Vs1=4\cos(\delta+45+\alpha 1/2)\cos(45+\alpha 1/2) \quad (20)$$

The sum Va1, which is calculated by adding the cosine signal −Vx2a and the sine signal Vy after equalizing the amplitudes, is expressed by the following equation (21).

$$Vx=2\cos\delta \quad (5)$$

$$Vy=2\sin(\delta+\alpha 0) \quad (7)$$

$$Va1=-2Vx2a+Vy=2\cos\delta+2\sin(\delta+\alpha 1)=2\{\cos\delta-\cos(\delta+90+\alpha 1)\} \quad (21)$$

By transforming the equation (21) by the product formula, the addition value Va1 is expressed by the following equation (22).

$$Va1=4\sin(\delta+45+\alpha 1/2)\sin(45+\alpha 1/2) \quad (22)$$

The maximum value Vs1max of the subtraction value Vs1 and the maximum value Va1max of the addition value Va0 are expressed by the following equations (23) and (24), respectively.

$$Vs1\mathrm{max}=4\cos(45+\alpha 1/2) \quad (23)$$

$$Va1\mathrm{max}=4\sin(45+\alpha 1/2) \quad (24)$$

The arctangent of a quotient, which is calculated by dividing the maximum value Va1max of the addition value Va1 by the maximum value Vs1max of the subtraction value Vs1, is calculated as the phase correction value φ1 as expressed by the following equation (25).

$$\phi 1=ATAN(Va1\mathrm{max}/Vs1\mathrm{max})=45+\alpha 1/2 \quad (25)$$

<Phase Correction Value φ2>

The phase correction value φ2 is calculated based on the +cosine signal Vx1 and the sine signal Vy. Assuming that the phase deviation is α2 with the +cosine signal Vx1 being the reference, the +cosine signal Vx1 and the sine signal Vy are expressed as follows. The +cosine signal Vx1 is subjected to cancellation of an offset value in the control circuit 51 and is Vx1a.

$$Vx1a=\cos\delta \quad (26)$$

$$Vy=2\sin(\delta+\alpha 2) \quad (27)$$

A subtraction value Vs2 is calculated as follows by subtracting the sine signal Vy from the +cosine signal Vx1a.

$$Vs2=2Vx1a-Vy=2\cos\delta-2\sin(\delta+\alpha 2)=2\{\cos\delta+\cos(\delta+90+\alpha 2)\} \quad (28)$$

By transforming the equation (28) by the product formula, the subtraction value Vs2 is expressed by the following equation (29).

$$Vs2=4\cos(\delta+45+\alpha 2/2)\cos(45+\alpha 2/2) \quad (29)$$

The sum Va2, which is calculated by adding the +cosine signal Vx1a and the sine signal Vy after equalizing the amplitudes, is expressed as follows.

$$Va2=2Vx1a+Vy=2\cos\delta+2\sin(\delta+\alpha 2)=2\{\cos\delta-\cos(\delta+90+\alpha 2)\} \quad (30)$$

By transforming the equation (30) by the product formula, the addition value Va2 is expressed by the following equation (31).

$$Va2=4\sin(\delta+45+\alpha 2/2)\sin(45+\alpha 2/2) \quad (31)$$

The maximum value Vs2max of the subtraction value Vs2 and the maximum value Va2max of the addition value Va2 are expressed by the following equations (32) and (33), respectively.

$$Vs2\mathrm{max}=4\cos(45+\alpha 2/2) \quad (32)$$

$$Va2\mathrm{max}=4\sin(45+\alpha 2/2) \quad (33)$$

The arctangent of a quotient, which is calculated by dividing the maximum value Va2max of the addition value Va2 by the maximum value Vs2max of the subtraction value Vs2, is calculated as the phase correction value φ2 as expressed by the following equation (34).

$$\phi 2=ATAN(Va2\mathrm{max}/Vs2\mathrm{max})=45+\alpha 2/2 \quad (34)$$

<Phase Correction Value φ3>

The phase correction value φ3 is calculated based on the cosine signal Vx and the −sine signal Vy2. Assuming that the phase deviation is α3 with the cosine signal Vx being the reference, the cosine signal Vx and the −sine signal Vy2 are expressed as follows. The −sine signal Vy2 is subjected to cancellation of an offset value in the control circuit 51 and is converted to the +sine signal, which is −Vy2a.

$$Vx = 2\cos\delta \quad (5)$$

$$Vy2a = -\sin(\delta+\alpha 3) - Vy2a = \sin(\delta+\alpha 3) \quad (35)$$

A subtraction value Vs3 is calculated as follows by subtracting the sine signal −Vy2a from the cosine signal Vx.

$$Vs3 = Vx - (-2Vy2a) = 2\cos\delta - 2\sin(\delta+\alpha 3) = 2\{\cos\delta + \cos(\delta+90+\alpha 3)\} \quad (36)$$

By transforming the equation (36) by the product formula, the subtraction value Vs3 is expressed by the following equation (37).

$$Vs3 = 4\cos(\delta+45+\alpha 3/2)\cos(45+\alpha 3/2) \quad (37)$$

The addition value Va3, which is calculated by adding the cosine signal Vx and the sine signal −Vy2a after equalizing the amplitudes, is expressed by the following equation (38).

$$Va3 = Vx + (-2Vy2a) = 2\cos\delta + 2\sin(\delta+\alpha 3) = 2\{\cos\delta - \cos(\delta+90+\alpha 3)\} \quad (38)$$

By transforming the equation (38) by the product formula, the addition value Va3 is expressed by the following equation (39).

$$Va3 = 4\sin(\delta+45+\alpha 3/2)\sin(45+\alpha 3/2) \quad (39)$$

The maximum value Vs3max of the subtraction value Vs3 and the maximum value Va3max of the addition value Va3 are expressed by the following equations (40) and (41), respectively.

$$Vs3\text{max} = 4\cos(45+\alpha 3/2) \quad (40)$$

$$Va3\text{max} = 4\sin(45+\alpha 3/2) \quad (41)$$

The arctangent of a quotient, which is calculated by dividing the maximum value Va3max of the addition value Va3 by the maximum value Vs3max of the subtraction value Vs3, is calculated as the phase correction value φ3 as expressed by the following equation (42).

$$\phi 3 = \text{ATAN}(Va3\text{max}/Vs3\text{max}) = 45 + \alpha 3/2 \quad (42)$$

<Phase Correction Value φ4>

The phase correction value φ4 is calculated based on the cosine signal Vx and the +sine signal Vy1. Assuming that the phase deviation is α4 with the cosine signal Vx being the reference, the cosine signal Vx and the +sine signal Vy1 are expressed as follows. The +sine signal Vy1 is subjected to cancellation of an offset value in the control circuit 51 and is Vy1a.

$$Vx = 2\cos\delta \quad (5)$$

$$Vy1a = \sin(\delta+\alpha 4) \quad (43)$$

A subtraction value Vs4 is calculated as follows by subtracting the +sine signal Vy1a from the cosine signal Vx.

$$Vs4 = Vx - 2Vy1a = 2\cos\delta - 2\sin(\delta+\alpha 4) = 2\{\cos\delta + \cos(\delta+90+\alpha 4)\} \quad (44)$$

By transforming the equation (44) by the product formula, the subtraction value Vs4 is expressed by the following equation (45).

$$Vs4 = 4\cos(\delta+45+\alpha 4/2)\cos(45+\alpha 4/2) \quad (45)$$

The addition value Va4, which is calculated by adding the cosine signal Vx and the +sine signal Vy2a after equalizing the amplitudes, is expressed as follows.

$$Va4 = Vx + 2Vy1a = 2\cos\delta + 2\sin(\delta+\alpha 4) = 2\{\cos\delta - \cos(\delta+90+\alpha 4)\} \quad (46)$$

By transforming the equation (46) by the product formula, the addition value Va4 is expressed by the following equation (47).

$$Va4 = 4\sin(\delta+45+\alpha 4/2)\sin(45+\alpha 4/2) \quad (47)$$

The maximum value Vs4max of the subtraction value Vs4 and the maximum value Va4max of the addition value Va4 are expressed by the following equations (48) and (49), respectively.

$$Vs4\text{max} = 4\cos(45+\alpha 4/2) \quad (48)$$

$$Va4\text{max} = 4\sin(45+\alpha 4/2) \quad (49)$$

The arctangent of a quotient, which is calculated by dividing the maximum value Va4max of the addition value Va4 by the maximum value Vs4max of the subtraction value Vs4, is calculated as the phase correction value φ4 as expressed by the following equation (50).

$$\phi 4 = \text{ATAN}(Va4\text{max}/Vs4\text{max}) = 45 + \alpha 4/2 \quad (50)$$

<Phase Correction Value φ5>

The phase correction value φ5 is calculated based on the −cosine signal Vx2 and the −sine signal Vy2. Assuming that the phase deviation is α5 with the −cosine signal Vx2 being the reference, the −cosine signal Vx2 and the −sine signal Vy2 are expressed as follows. The −cosine signal Vx2 and the −sine signal Vy2 are subjected to cancellation of offset values in the control circuit 51 and are converted to the +cosine signal and the +sine signal, which are −Vx2a and −Vy2a, respectively.

$$Vx2a = -\cos\delta$$

$$-Vx2a = \cos\delta \quad (51)$$

$$Vy2a = -\sin(\delta+\alpha 5) - Vy2a = \sin(\delta+\alpha 5) \quad (52)$$

A subtraction value Vs5 is calculated as follows by subtracting the +sine signal Vy1a from the cosine signal Vx.

$$Vs5 = -Vx2a - (-Vy2a) = \cos\delta - \sin(\delta+\alpha 5) = \cos\delta + \cos(\delta+90+\alpha 5) \quad (53)$$

By transforming the equation (53) by the product formula, the subtraction value Vs5 is expressed by the following equation (54).

$$Vs5 = 2\cos(\delta+45+\alpha 5/2)\cos(45+\alpha 5/2) \quad (54)$$

The addition value Va5, which is calculated by adding the cosine signal −Vx2a and the sine signal −Vy2a, is expressed as follows.

$$Va5 = -Vx2a + (-Vy2a) = \cos\delta + \sin(\delta+\alpha 5) = \cos\delta - \cos(\delta+90+\alpha 5) \quad (55)$$

By transforming the equation (55) by the product formula, the addition value Va5 is expressed by the following equation (56).

$$Va5 = 2\sin(\delta+45+\alpha 5/2)\sin(45+\alpha 5/2) \quad (56)$$

The maximum value Vs5max of the subtraction value Vs5 and the maximum value Va5max of the addition value Va5 are expressed by the following equations (57) and (58), respectively.

$$Vs5\text{max} = 2\cos(45+\alpha 5/2) \quad (57)$$

$$Va5\text{max} = 2\sin(45+\alpha 5/2) \quad (58)$$

The arctangent of a quotient, which is calculated by dividing the maximum value Va5max of the addition value Va5 by the maximum value Vs5max of the subtraction value Vs5, is calculated as the phase correction value φ5 as expressed by the following equation (59).

$$\phi 5 = \text{ATAN}(Va5\text{max}/Vs5\text{max}) = 45 + \alpha 5/2 \quad (59)$$

<Phase Correction Value φ6>

The phase correction value φ6 is calculated based on the −cosine signal Vx2 and the +sine signal Vy1. Assuming that the phase deviation is α6 with the −cosine signal Vx2 being the reference, the −cosine signal Vx2 and the +sine signal Vy1 are expressed as follows. The −cosine signal Vx2 and the +sine signal Vy1 are subjected to cancellation of offset values in the control circuit 51 and the −cosine signal Vx2 is converted to the +cosine signal, which is −Vx2a.

$$Vx2a = -\cos\delta - Vx2a = \cos\delta \quad (60)$$

$$Vy1a = \sin(\delta + \alpha 6) \quad (61)$$

A subtraction value Vs6 is calculated as follows by subtracting the +sine signal Vy1a from the cosine signal −Vx2a.

$$Vs6 = -Vx2a - Vy1a = \cos\delta - \sin(\delta + \alpha 6) = \cos\delta + \cos(\delta + 90 + \alpha 6)\} \quad (62)$$

By transforming the equation (62) by the product formula, the subtraction value Vs6 is expressed by the following equation (63).

$$Vs6 = 2\cos(\delta + 45 + \alpha 6/2)\cos(45 + \alpha 6/2) \quad (63)$$

The addition value Va6, which is calculated by adding the cosine signal −Vx2a and the +sine signal Vy1a, is expressed as follows.

$$Va6 = -Vx2a + Vy1a = \cos\delta + \sin(\delta + \alpha 6) = \cos\delta - \cos(\delta + 90 + \alpha 6) \quad (64)$$

By transforming the equation (64) by the product formula, the addition value Va6 is expressed by the following equation (65).

$$Va6 = 2\sin(\delta + 45 + \alpha 6/2)\sin(45 + \alpha 6/2) \quad (65)$$

The maximum value Vs6max of the subtraction value Vs6 and the maximum value Va6max of the addition value Va6 are expressed by the following equations (66) and (67), respectively.

$$Vs6\max = 2\cos(45 + \alpha 6/2) \quad (66)$$

$$Va6\max = 2\sin(45 + \alpha 6/2) \quad (67)$$

The arctangent of a quotient, which is calculated by dividing the maximum value Va6max of the addition value Va6 by the maximum value Vs6max of the subtraction value Vs6, is calculated as the phase correction value φ6 as expressed by the following equation (68).

$$\phi 6 = \text{ATAN}(Va6\max/Vs6\max) = 45 + \alpha 6/2 \quad (68)$$

<Phase Correction Value φ7>

The phase correction value φ7 is calculated based on the +cosine signal Vx1 and the −sine signal Vy2. Assuming that the phase deviation is α7 with the +cosine signal Vx1 being the reference, the +cosine signal Vx1 and the −sine signal Vy2 are expressed as follows. The +cosine signal Vx1 and the −sine signal Vy2 are subjected to cancellation of offset values in the control circuit 51 and the −sine signal Vy2 is converted to the +sine signal, which is −Vy2a.

$$Vx1a = \cos\delta \quad (69)$$

$$Vy2a = -\sin(\delta + \alpha 7) - Vy2a = \sin(\delta + \alpha 7) \quad (70)$$

A subtraction value Vs7 is calculated as follows by subtracting the sine signal −Vy2a from the +cosine signal Vx1a.

$$Vs7 = Vx1a - (-Vy2a) = \cos\delta - \sin(\delta + \alpha 7) = \cos\delta + \cos(\delta + 90 + \alpha 7) \quad (71)$$

By transforming the equation (71) by the product formula, the subtraction value Vs7 is expressed by the following equation (72).

$$Vs7 = 2\cos(\delta + 45 + \alpha 7/2)\cos(45 + \alpha 7/2) \quad (72)$$

The addition value Va7, which is calculated by adding the cosine signal +Vx1a and the sine signal −Vy2a, is expressed as follows.

$$Va7 = Vx1a + (-Vy2a) = \cos\delta + \sin(\delta + \alpha 7) = \cos\delta - \cos(\delta + 90 + \alpha 7) \quad (73)$$

By transforming the equation (73) by the product formula, the addition value Va7 is expressed by the following equation (74).

$$Va7 = 2\sin(\delta + 45 + \alpha 7/2)\sin(45 + \alpha 7/2) \quad (74)$$

The maximum value Vs7max of the subtraction value Vs7 and the maximum value Va7max of the addition value Va7 are expressed by the following equations (75) and (76), respectively.

$$Vs7\max = 2\cos(45 + \alpha 7/2) \quad (75)$$

$$Va7\max = 2\sin(45 + \alpha 7/2) \quad (76)$$

The arctangent of a quotient, which is calculated by dividing the maximum value Va7max of the addition value Va7 by the maximum value Vs7max of the subtraction value Vs7, is calculated as the phase correction value φ7 as expressed by the following equation (77).

$$\phi 7 = \text{ATAN}(Va7\max/Vs6\max) = 45 + \alpha 7/2 \quad (77)$$

<Phase Correction Value φ8>

The phase correction value φ8 is calculated based on the +cosine signal Vx1 and the +sine signal Vy1. Assuming that the phase deviation is α8 with the +cosine signal Vx1 being the reference, the +cosine signal Vx1 and the +sine signal Vy1 are expressed as follows. The +cosine signal Vx1 and the +sine signal Vy1 are subjected to cancellation of offset values in the control circuit 51 and are Vx1a and Vy1a, respectively.

$$Vx1a = \cos\delta \quad (78)$$

$$Vy1a = \sin(\delta + \alpha 8) \quad (79)$$

A subtraction value Vs8 is calculated as follows by subtracting the +sine signal Vy1a from the +cosine signal Vx1a.

$$Vs8 = Vx1a - Vy1a = \cos\delta - \sin(\delta + \alpha 8) = \cos\delta + \cos(\delta + 90 + \alpha 8) \quad (80)$$

By transforming the equation (80) by the product formula, the subtraction value Vs8 is expressed by the following equation (81).

$$Vs8 = 2\cos(\delta + 45 + \alpha 8/2)\cos(45 + \alpha 8/2) \quad (81)$$

The addition value Va8, which is calculated by adding the +cosine signal Vx1a and the +sine signal Vy1a, is expressed as follows.

$$Va8 = Vx1a + Vy1a = \cos\delta + \sin(\delta + \alpha 8) = \cos\delta - \cos(\delta + 90 + \alpha 8) \quad (82)$$

By transforming the equation (82) by the product formula, the addition value Va8 is expressed by the following equation (83).

$$Va8 = 2\sin(\delta + 45 + \alpha 8/2)\sin(45 + \alpha 8/2) \quad (83)$$

The maximum value Vs8max of the subtraction value Vs8 and the maximum value Va8max of the addition value Va8 are expressed by the following equations (84) and (85), respectively.

$$Vs8\max = 2\cos(45 + \alpha 8/2) \quad (84)$$

$$Va8\max = 2\sin(45 + \alpha 8/2) \quad (85)$$

The arctangent of a quotient, which is calculated by dividing the maximum value Va8max of the addition value Va8 by the maximum value Vs8max of the subtraction value Vs8, is calculated as the phase correction value φ8 as expressed by the following equation (86).

$$\phi 8 = ATAN(Va8max/Vs8max) = 45 + \alpha 8/2 \quad (86)$$

The phase correction values φ0 to φ8 calculated as described above are all constants and are stored in the memory circuit 52 (S13 in FIG. 5).

The rotation angle detection processing for detecting the rotation angle of the detection target 87 will be described next with reference to flowcharts shown in FIG. 6 and FIG. 7. The rotation angle detection processing shown in FIG. 6 and FIG. 7 is performed at a predetermined interval, for example 200 µs, while the EPS is in operation.

Figure 6:
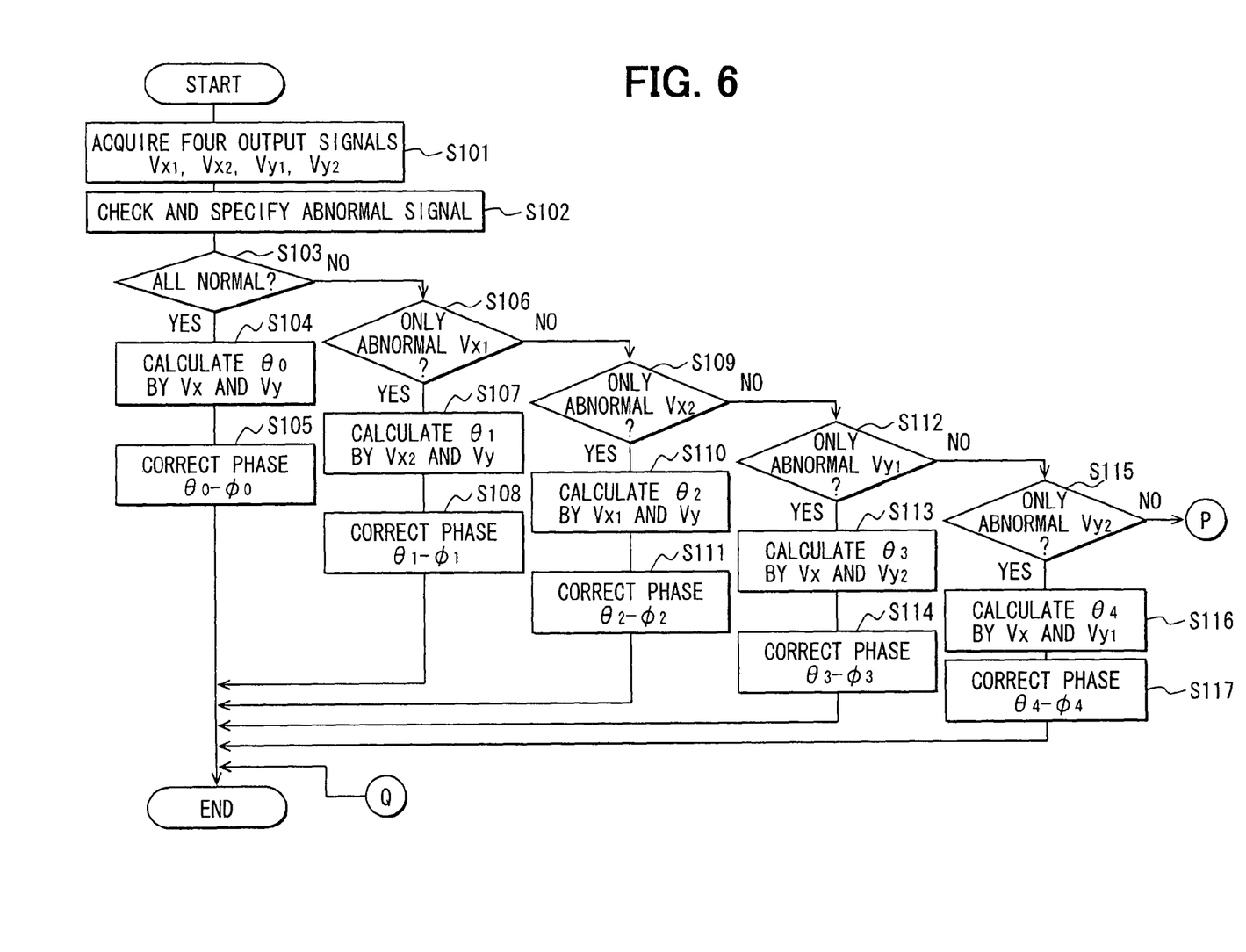
FIG. 6 is a flowchart showing rotation angle detection processing performed in the embodiment of the present invention.
Figure 7:
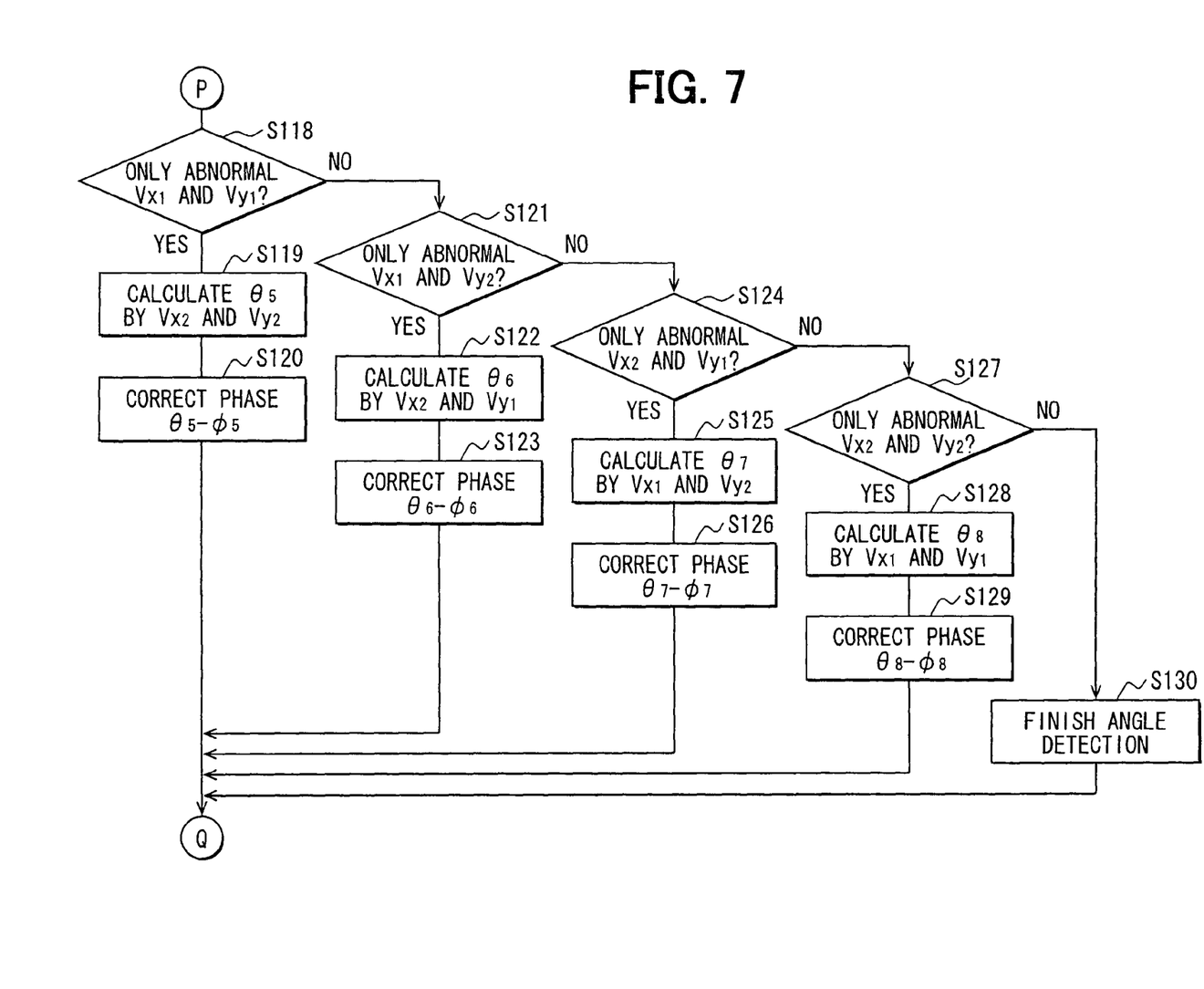
FIG. 7 is a flowchart showing the rotation angle detection processing performed in the embodiment of the present invention.

At S101 in FIG. 6, four output signals Xx1, Vx2, Vy1 and Vy2 are acquired. The cosine signal Vx calculated by subtraction between cosine signals and the sine signal Vy calculated by subtraction between sine signals are calculated (refer to equations (1) to (6)).

At S102, the four output signals Vx1, Vx2, Vx3 and Vx4 are checked whether normal or abnormal, and any signal which is not normal is determined to be abnormal. The output signal, which is abnormal, may be determined by a conventional method. For example, the output signal may be determined to be abnormal if the output signal rises above a predetermined upper limit value or falls below a predetermined lower limit value.

At S103, it is checked whether all the output signals are normal. If at least one of the output signal is abnormal (S103: NO), S106 is performed. If all the output signals are normal (S103: YES), S104 is performed. At S104, since all the output signals are normal, a pre-correction rotation angle θ0, which is as detected and not corrected, is calculated based on the cosine signal Vx and the sine signal Vy.

The pre-correction rotation angle θn is calculated as follows. The pre-correction rotation angle θn is calculated in correspondence to the phase correction values φ0 to φ8 at steps in the rotation angle detection processing shown in FIG. 6 and FIG. 7. Specifically, the pre-correction rotation angle θ0 is calculated based on the output signals used to calculate the phase correction value φ0 and calculation values calculated by using the output signals. First, before calculation of the pre-correction rotation angle θn, a quotient Vsdn is calculated by dividing the subtraction value Vsn by the maximum value Vsnmax of the subtraction value Vsn, and a quotient Vadn is calculated by dividing the addition value Van by the maximum value Vanmax of the addition value Van for equalizing the amplitudes. In this calculation of the quotients Vsdn and the Vadn, the subtraction value Vsn, the addition value Van, the maximum value Vsnmax of the subtraction value Vsn and the maximum value Vanmax of the addition value Van, which are used to calculate the phase correction values φ0 to φ8 are used.

$$Vsdn = Vsn/Vsnmax = \cos(\delta + 45 + \alpha n/2) \quad (87)$$

$$Vadn = Van/Vanmax = \sin(\delta + 45 + \alpha n/2) \quad (88)$$

It is noted that, with respect to the quotients Vsdn and Vadn, "n" is variable from 0 to 8. In case of n=0, for example, the quotient Vsd0 is calculated by dividing Vs0 by Vs0max, and the quotient Vad0 is calculated by dividing Va0 by Va0max.

Figure 8:
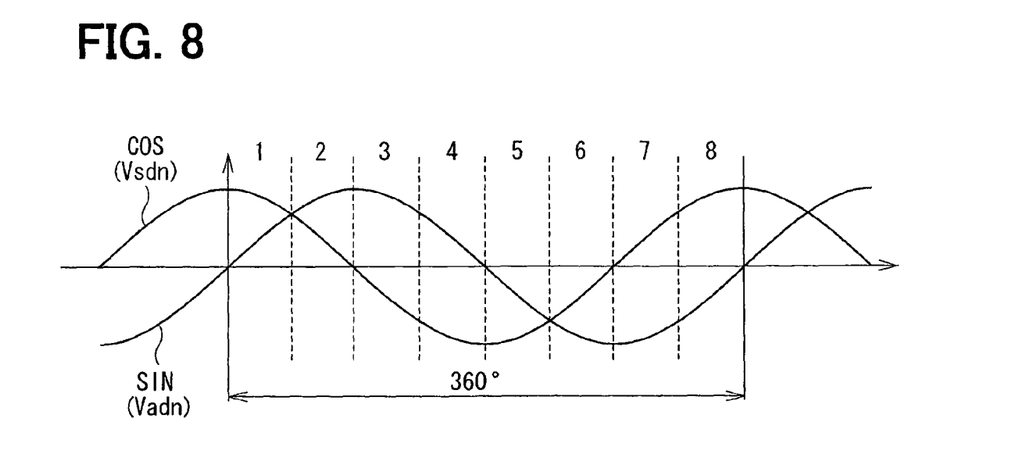
FIG. 8 is a signal diagram showing divided angular ranges for the sine signal and the cosine signal used to calculate a rotation angle of a detection target in relation to phase correction value calculation processing in the embodiment of the present invention.
Figure 9:
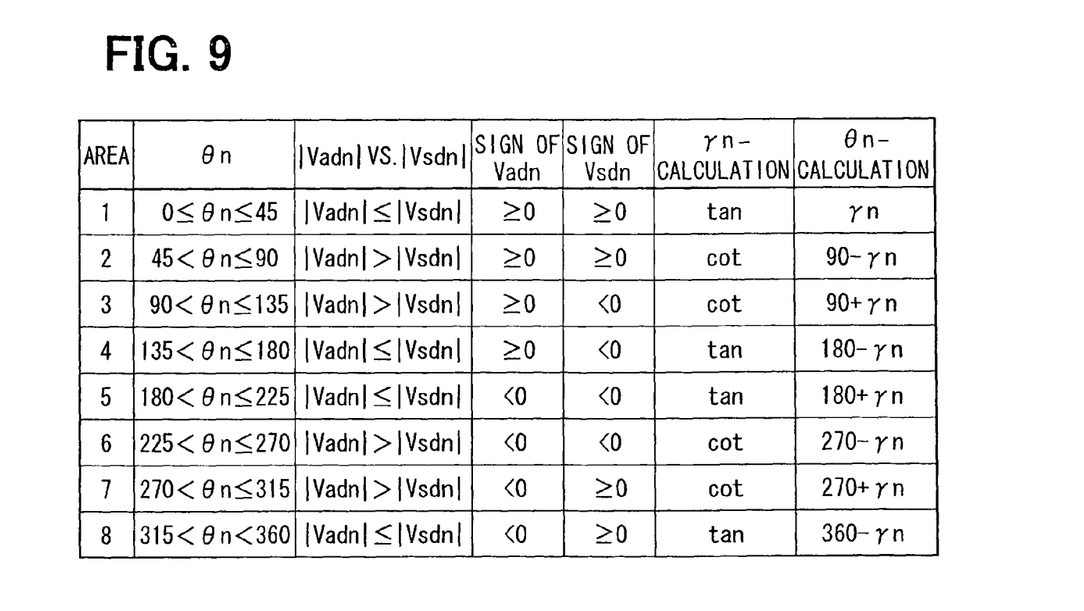
FIG. 9 is a table showing rotation angles of the detection target according to the embodiment of the present invention.

Next, the pre-correction rotation angle θn is calculated from an angle γn, which is the arctangent calculated by using the quotients Vsdn and Vadn, as described next with reference to FIG. 8 and FIG. 9. FIG. 8 shows angular ranges related to the calculation of the pre-correction rotation angle θn. In FIG. 8, the sine signal corresponds to Vadn and the cosine signal corresponds to Vsdn. FIG. 9 shows a table, by which the pre-correction rotation angle θn is calculated based on the angle γn. The pre-correction rotation angle θn is calculated based on the angle γn (n=0 to 8), which is the arctangent calculated by using Vsdn and Vadn. The angle γn is calculated as expressed by the following equations (89) and (90).

$$\gamma n = ATAN(Vadn/Vsdn) \quad (89)$$

$$\gamma n = ATAN(Vsdn/Vadn) \quad (90)$$

As expressed by equations (89) and (90), the angle γn is calculated as the arctangent of the quotient (hereinafter referred to as tangent value), which is calculated by dividing the sine signal, Vadn, by the cosine signal, Vsdn, or as arctangent of the quotient (hereinafter referred to as cotangent value), which is calculated by dividing the cosine signal, Vsdn, by the sine signal, Vadn. Since Vadn and Vsdn may take 0, it is necessary to avoid division by 0. For this reason, the angle γn is calculated based on the tangent value, which is calculated by dividing by the cosine signal, over an angular range including the angle at which the sine signal Vadn is 0. Similarly, the angle γn is calculated based on the cotangent value, which is calculated by dividing by the sine signal, over an angular range including the angle at which the cosine signal Vsdn is 0. In case that Vadn or Vsdn is a negative signal, the tangent value and the cotangent value are calculated after converting it to a positive value by multiplying −1, for example. If the pre-correction rotation angle θn is assumed to vary from 0° to 360°, the tangent value and the cotangent value become equal at different pre-correction rotation angle θn. For this reason, the pre-correction rotation angle θn is calculated based on the tangent value or the cotangent value after specifying an angular range of the pre-correction rotation angle θn based on a magnitude relation between the absolute value of Vadn and the absolute value of Vsdn, sign of Vadn and sign of Vsdn.

Specifically, as shown in FIG. 8 and FIG. 9, based on the magnitude relation between the absolute value of Vadn and the absolute value of Vsdn, the sign of Vadn and the sign of Vsdn, the pre-correction rotation angle θn is determined to which one of eight areas 1 to 8 in the range of 0 degree to 360 degrees. By comparing the absolute value of Vadn and the absolute value Vsdn, the tangent value or the cotangent value is used so that the Vadn or Vsdn of the greater absolute value becomes a denominator. The angle γn, which is the arctangent value of the tangent value or the cotangent value, is calculated. In FIG. 9, γn-calculation indicates a method of calculating γn and specifies which one of the tangent value or the cotangent value is used to calculate the arctangent value. Since the angular range of the pre-correction rotation angle θn is specified, the pre-correction rotation angle θn is calculated by adding or subtracting the angle γn, which is calculated at each reference angle, 0° (360°), 90°, 180° and 270°. The pre-correction rotation angle θn is expressed by the following equation (91).

$$\theta n = \delta + 45 + \alpha n/2 \quad (91)$$

Referring to FIG. 6, at S104, the pre-correction rotation angle θ0 calculated from the angle γ0, which is the arctangent value of the tangent value and the cotangent value based on Vad0 and Vsd0 is calculated as expressed by the following equation (92).

$$\theta 0 = \delta + 45 + \alpha 0/2 \quad (92)$$

At S105, the phase correction value φ0, which is calculated based on the cosine signal Vx and the sine signal Vy and stored in the memory circuit 52, is acquired. The pre-correction rotation angle θ0 calculated at S104 is corrected based on the acquired phase correction value φ0. Specifically, by subtracting the phase correction value φ0 from the pre-correction rotation angle θ0, the rotation angle δ of the detection target 87 is calculated as expressed by the equation (93).

$$\theta 0 - \phi 0 = (\delta + 45 + \alpha 0/2) - (45 + \alpha 0/2) = \delta \quad (93)$$

At S106, which is performed if at least one output signal is abnormal (S103: NO), it is checked whether only the +cosine signal Vx1 is abnormal. If the +cosine signal Vx1 is not abnormal or other output signal is also abnormal in addition to abnormality of the +cosine signal Vx1 (S106: NO), S109 is performed. If only the +cosine signal Vx1 is abnormal (S106: YES), S107 is performed.

At S107, since only the +cosine signal Vx1 is abnormal, the pre-correction rotation angle θ1 is calculated based on the normal signals, that is, −cosine signal Vx2 and the singe signal Vy, from which sensor error is removed by subtraction between the sine signals. The pre-correction rotation angle θ1 calculated from the angle γ1, which is the arctangent value of the tangent value or the cotangent value based on Vad1 and Vsd1, is expressed by the following equation (94).

$$\theta 1 = \delta + 45 + \alpha 1/2 \quad (94)$$

At S108, the phase correction value φ1, which is calculated based on the −cosine signal Vx2 and the sine signal Vy and stored in the memory circuit 52, is acquired. Then the pre-correction rotation angle θ1 calculated at S107 is corrected based on the acquired phase correction value φ1. Specifically, the rotation angle δ of the detection target 87 is calculated by subtracting the phase correction value φ1 from the pre-correction rotation angle θ1 as expressed by the equation (95).

$$\theta 1 - \phi 1 = (\delta + 45 + \alpha 1/2) - (45 + \alpha 1/2) = \delta \quad (95)$$

At S109, which is performed if the +cosine signal Vx1 is not abnormal or other output signal is also abnormal in addition to abnormality of the +cosines signal Vx1 (S106: NO), it is checked whether only the −cosine signal Vx2 is abnormal. If the −cosine signal Vx2 is not abnormal or other output signal is also abnormal in addition to the abnormality of the −cosine signal Vx2 (S109: NO), S112 is performed. If only the −cosine signal Vx2 is abnormal (S109: YES), S110 is performed.

At S110, since only the −cosine signal Vx2 is abnormal, the pre-correction rotation angle θ2 is calculated based on the normal signals, that is, the +cosine signal Vx1 and the sine signal Vy, from which sensor error is removed by subtraction between the sine signals. The pre-correction rotation angle θ2 calculated from the angle γ2, which is the arctangent value of the tangent value or the cotangent value of Vad2 and Vsd2, is expressed by the following equation (96).

$$\theta 2 = \delta + 45 + \alpha 2/2 \quad (96)$$

At S111, the phase correction value φ2, which is calculated based on the +cosine signal Vx1 and the sine signal Vy and stored in the memory circuit 52, is acquired. Then the pre-correction rotation angle θ2 calculated at S110 is corrected based on the acquired phase correction value φ2. Specifically, the rotation angle δ of the detection target 87 is calculated by subtracting the phase correction value φ2 from the pre-correction rotation angle θ2 as expressed by the equation (97).

$$\theta 2 - \phi 2 = (\delta + 45 + \alpha 2/2) - (45 + \theta 2/2) = \delta \quad (97)$$

At S112, which is performed if the −cosine signal Vx2 is not abnormal or other output signal is also abnormal in addition to abnormality of the −cosine signal Vx2 (S109: NO), it is checked whether only the +sine signal Vy1 is abnormal. If the +sine signal Vy1 is not abnormal or other output signal is also abnormal in addition to the abnormality of the +sine signal Vy1 (S112: NO), S115 is performed. If only the +sine signal Vy1 is abnormal (S112: YES), S113 is performed. At S113, since only the +sine signal Vy1 is abnormal, the pre-correction rotation angle θ3 is calculated based on the normal signals, that is, the −sine signal Vy2 and the cosine signal Vx, from which sensor error is removed by subtraction between the cosine signals. The pre-correction rotation angle θ3 calculated from the angle γ3, which is the arctangent value of the tangent value or the cotangent value of Vad3 and Vsd3, is expressed by the following equation (98).

$$\theta 3 = \delta + 45 + \alpha 3/2 \quad (98)$$

At S114, the phase correction value φ3, which is calculated based on the cosine signal Vx and the −sine signal Vy2 and stored in the memory circuit 52, is acquired.

Then the pre-correction rotation angle θ3 calculated at S113 is corrected based on the acquired phase correction value φ3. Specifically, the rotation angle δ of the detection target 87 is calculated by subtracting the phase correction value φ3 from the pre-correction rotation angle θ3 as expressed by the equation (99).

$$\theta 3 - \phi 3 = (\delta + 45 + \alpha 3/2) - (45 + \alpha 3/2) = \delta \quad (99)$$

At S115, which is performed if the +sine signal Vy1 is not abnormal or other output signal is also abnormal in addition to abnormality of the +sine signals Vy1 (S112: NO), it is checked whether only the −sine signal Vy2 is abnormal.

If the −sine signal Vy2 is not abnormal or other output signal is also abnormal in addition to the abnormality of the −sine signal Vy2 (S115: NO), S118 shown in FIG. 7 is performed. If check result at S115 is NO, at least two output signals are abnormal. If only the −sine signal Vy2 is abnormal (S115: YES), S116 is performed.

At S116, since only the −sine signal Vy2 is abnormal, the pre-correction rotation angle θ4 is calculated based on the normal signals, that is, the +sine signal Vy1 and the cosine signal Vx, from which sensor error is removed by subtraction between the cosine signals. The pre-correction rotation angle θ4 calculated from the angle γ4, which is the arctangent value of the tangent value or the cotangent value of Vad4 and Vsd4, is expressed by the following equation (100).

$$\theta 4 = \delta + 45 + \alpha 4/2 \quad (100)$$

At S117, the phase correction value φ4, which is calculated based on the cosine signal Vx and the +sine signal Vy1 and stored in the memory circuit 52, is acquired. Then the pre-correction rotation angle θ4 calculated at S116 is corrected based on the acquired phase correction value φ4. Specifically, the rotation angle δ of the detection target 87 is calculated by subtracting the phase correction value φ4 from the pre-correction rotation angle θ4 as expressed by the equation (101).

$$\theta 4 - \phi 4 = (\delta + 45 + \alpha 4/2) - (45 + \alpha 4/2) = \delta \quad (101)$$

As shown in FIG. 7, at S118, which is performed if at least two output signals are abnormal (103: NO, S106: NO, S109: NO, S112: NO and S115: NO), it is checked whether only the output signals Vx1 and Vy1 are abnormal. If the abnormal output signal is other than the output signals Vx1 and Vy1 (S118: NO), S121 is performed. If only the output signals Vx1 and Vy1 are abnormal (S118: YES), S191 is performed.

At S119, the pre-correction rotation angle θ5 is calculated based on the normal signals, that is, the −cosine signal Vx2 and the −sine signal Vy2. The pre-correction rotation angle θ5 calculated from the angle γ5, which is the arctangent value of the tangent value or the cotangent value of Vad5 and Vsd5, is expressed by the following equation (102).

$$\theta 5 = \delta + 45 + \alpha 5/2 \qquad (102)$$

At S120, the phase correction value φ5, which is calculated based on the −cosine signal Vx2 and the −sine signal Vy2 and stored in the memory circuit 52, is acquired. Then the pre-correction rotation angle θ5 calculated at S119 is corrected based on the acquired phase correction value φ5. Specifically, the rotation angle δ of the detection target 87 is calculated by subtracting the phase correction value φ5 from the pre-correction rotation angle θ5 as expressed by the equation (103).

$$\theta 5 - \phi 5 = (\delta + 45 + \alpha 5/2) - (45 + \alpha 5/2) = \delta \qquad (103)$$

At S121, which is performed if the abnormal signal is other than the output signals Vx1 and Vy1 (S118: NO), it is checked whether only the output signals Vx1 and Vy2 are abnormal. If the abnormal signal is other than the output signals Vx1 and Vy2 (S121: NO), S124 is performed. If only the output signals Vx1 and Vy2 are abnormal (S121: YES), S122 is performed.

At S122, the pre-correction rotation angle θ6 is calculated based on the normal signals, that is, the −cosine signal Vx2 and the +sine signal Vy1. The pre-correction rotation angle θ6 calculated from the angle γ6, which is the arctangent value of the tangent value or the cotangent value of Vad6 and Vsd6, is expressed by the following equation (104).

$$\theta 6 = \delta + 45 + \alpha 6/2 \qquad (104)$$

At S123, the phase correction value φ6, which is calculated based on the −cosine signal Vx2 and the +sine signal Vy1 and stored in the memory circuit 52, is acquired. Then the pre-correction rotation angle θ6 calculated at S122 is corrected based on the acquired phase correction value φ6. Specifically, the rotation angle δ of the detection target 87 is calculated by subtracting the phase correction value φ6 from the pre-correction rotation angle θ6 as expressed by the equation (106).

$$\theta 6 - \phi 6 = (\delta + 45 + \alpha 6/2) - (45 + \alpha 6/2) = \delta \qquad (105)$$

At S124, which is performed if the abnormal signal is other than the output signals Vx1 and Vy2 (S121: NO), it is checked whether only the output signals Vx2 and Vy1 are abnormal. If the abnormal signal is other than the output signals Vx2 and Vy1 (S124: NO), S127 is performed. If only the output signals Vx2 and Vy1 are abnormal (S124: YES), S125 is performed.

At S125, the pre-correction rotation angle θ7 is calculated based on the normal signals, that is, the +cosine signal Vx1 and the −sine signal Vy2. The pre-correction rotation angle θ7 calculated from the angle γ7, which is the arctangent value of the tangent value or the cotangent value of Vad7 and Vsd7, is expressed by the following equation (106).

$$\theta 7 = \delta + 45 + \alpha 7/2 \qquad (106)$$

At S126, the phase correction value φ7, which is calculated based on the +cosine signal Vx1 and the −sine signal Vy2 and stored in the memory circuit 52, is acquired. Then the pre-correction rotation angle θ7 calculated at S125 is corrected based on the acquired phase correction value φ7. Specifically, the rotation angle δ of the detection target 87 is calculated by subtracting the phase correction value φ7 from the pre-correction rotation angle θ7 as expressed by the equation (107).

$$\theta 7 - \phi 7 = (\delta + 45 + \alpha 7/2) - (45 + \alpha 7/2) = \delta \qquad (107)$$

At S127, which is performed if the abnormal signal is other than the output signals Vx2 and Vy1 (S124: NO), it is checked whether only the output signals Vx2 and Vy2 are abnormal. If the abnormal signal is other than the output signals Vx2 and Vy2 (S127: NO), S130 is performed. If only the output signals Vx2 and Vy2 are abnormal (S127: YES), S128 is performed.

At S128, the pre-correction rotation angle θ8 is calculated based on the normal signals, that is, the +cosine signal Vx1 and the +sine signal Vy1. The pre-correction rotation angle θ8 calculated from the angle γ8, which is the arctangent value of the tangent value or the cotangent value of Vad8 and Vsd8, is expressed by the following equation (108).

$$\theta 8 = \delta + 45 + \alpha 8/2 \qquad (108)$$

At S129, the phase correction value φ8, which is calculated based on the +cosine signal Vx1 and the +sine signal Vy1 and stored in the memory circuit 52, is acquired. Then the pre-correction rotation angle θ8 calculated at S128 is corrected based on the acquired phase correction value φ8. Specifically, the rotation angle δ of the detection target 87 is calculated by subtracting the phase correction value φ8 from the pre-correction rotation angle θ8 as expressed by the equation (109).

$$\theta 8 - \phi 8 = (\delta + 45 + \alpha 8/2) - (45 + \alpha 8/2) = \delta \qquad (109)$$

At S127, which is performed if the abnormal signal is other than the output signals Vx2 and Vy2 (S127: NO), all the cosine signals, all the sine signals or all the cosine signals and the sine signals are abnormality is checked whether only the output signals Vx2 and Vy2 are. Hence, the angle detection is terminated. The rotation angle δ calculated at S105, S108, S111, S114, S117, S120, S123, S126 or S129 is used to control driving of the motor 80.

As described above, the control circuit 51 of the rotation angle detection device 10 acquires the output signals Vx1, Vx2, Vy1 and Vy2, which are produced from the junctions of the half-bridges 14 to 17, individually. The acquired output signals Vx1, Vx2, Vy1 and Vy2 are different in phase one another. The control circuit 51 calculates the pre-correction rotation angles θ0 to θ8 of the detection target 87 based on the output signals Vx1, Vx2, Vy1 and Vy2 (S104, S107, S110, S113, S116 in FIG. 6, and S119, S122, S125, S126 in FIG. 7).

The control circuit 51 calculates the phase correction values φ0 to φ8 in accordance with the output signals Vx1, Vx2, Vy1 and Vy2 (S12 in FIG. 5). The calculated phase correction values φ0 to φ8 are stored in the memory circuit 52 (S13). The control circuit 51 acquires the phase correction values φ0 to φ8 stored in the memory circuit 52, corrects the pre-correction rotation angles θ0 to θ8 based on the acquired phase correction values φ0 to φ8, and calculates the rotation angles δ of the detection target 87 (S105, S108, S111, S114, S117 in FIG. 6 and S120, S123, S126, S129 in FIG. 7). Thus, since the pre-correction rotation angles θ0 to θ8 are corrected based on the phase correction values φ0 to φ8, the rotation angle δ of the detection object 87 is calculated accurately. Since the phase correction values φ0 to φ8 are calculated based on the acquired output signals Vx1, Vx2, Vy1 and Vy2, it is not necessary to measure precisely the rotation angle from an external part.

The output signals according to the present embodiment include the cosine signal and the sine signal. The four output signals Vx1, Vx2, Vy1 and Vy2 are acquired. Thus, even if one or some of the output signals Vx1, Vx2, Vy1 and Vy2 becomes abnormal, the rotation angle δ of the detection target 87 is detected continuously with high accuracy. The output signals Vx1, Vx2, Vy1 and Vy2 are the +cosine signal, the −cosine signal, the +sine signal and the −sine signal, respectively. Therefore, even if one or some of the output signals becomes abnormal, the rotation angle δ of the detection target 87 is detected continuously as long as either one of the +cosine signal Vx1 and the −cosine signal Vx2 is normal and either one of the +sine signal Vy1 and −sine signal Vy2 is normal.

If all the output signals Vx1, Vx2, Vy1 and Vy2 are normal (S103: YES), the pre-correction angle θ0 is calculated based on the cosine signal Vx, which is calculated based on the +cosine signal Vx1 and −cosine signal Vx2, and the sine signal Vy, which is calculated based on the +sine signal Vy1 and the −sine signal Vy2 (S104).

The control circuit 51 calculates the phase correction value φ0 based on the cosine signal Vx, which is calculated based on the +cosine signal Vx1 and the −cosine signal Vx2, and the sine signal Vy, which is calculated based on the +sine signal Vy1 and the −sine signal Vy2. The control circuit 51 corrects the pre-correction rotation angle θ0 based on the phase correction value φ0 and calculates the rotation angle δ of the detection target 87. Thus, the pre-correction rotation angle θ0 and the phase correction value φ0 are calculated based on the cosine signal Vx and the sine signal Vy, which are free from the sensor error, and the rotation angle δ of the detection object 87 is calculated with high accuracy.

If only the +cosine signal Vx1 is abnormal (S106: YES), the pre-correction angle θ1 is calculated based on the −cosine signal Vx2 (S107). The pre-correction rotation angle θ1 is corrected based on the phase correction value φ1, which is calculated based on the −cosine signal. The rotation angle δ of the detection object 87 is thus calculated (S108). If only the −cosine signal Vx2 is abnormal (S109: YES), the pre-correction angle θ2 is calculated based on the +cosine signal Vx1 (S110). The pre-correction rotation angle θ2 is corrected based on the phase correction value φ2, which is calculated based on the +cosine signal. The rotation angle δ of the detection object 87 is thus calculated (S111). Thus, even if the +cosine signal or the −cosine signal is abnormal, the rotation angle δ of the detection target 87 is calculate with high accuracy based on the pre-correction rotation angle and the phase correction value calculated based on the +cosine signal or the −cosine signal, which is normal.

If only the +sine signal Vy1 is abnormal (S112: YES), the pre-correction angle θ3 is calculated based on the −sine signal Vy2 (S113). The pre-correction rotation angle θ3 is corrected based on the phase correction value φ3, which is calculated based on the −sine signal Vy2. The rotation angle δ of the detection object 87 is thus calculated (S114). If only the −sine signal Vy2 is abnormal (S116: YES), the pre-correction angle θ4 is calculated based on the +sine signal Vy1 (S116). The pre-correction rotation angle θ4 is corrected based on the phase correction value φ2, which is calculated based on the +sine signal Vy1. The rotation angle δ of the detection object 87 is thus calculated (S117). Thus, even if the +sine signal Vy1 or the −sine signal Vy2 is abnormal, the rotation angle δ of the detection target 87 is calculated with high accuracy based on the pre-correction rotation angle and the phase correction value calculated based on the +sine signal Vy1 or the −sine signal Vy2, which is normal.

If both the +cosine signal Vx1 and the +sine signal Vy1 are abnormal (S118: YES), the pre-correction angle θ5 is calculated based on the −cosine signal Vx2 and the −sine signal Vy2 (S119). The pre-correction rotation angle θ5 is corrected based on the phase correction value φ5, which is calculated based on the −cosine signal Vx2 and the −sine signal Vy2. The rotation angle δ of the detection object 87 is thus calculated (S120).

If both the +cosine signal Vx1 and the −sine signal Vy2 are abnormal (S121: YES), the pre-correction angle θ6 is calculated based on the −cosine signal Vx2 and the +sine signal Vy1 (S122). The pre-correction rotation angle θ6 is corrected based on the phase correction value φ6, which is calculated based on the −cosine signal Vx2 and the +sine signal Vy1. The rotation angle δ of the detection object 87 is thus calculated (S123).

If both the −cosine signal Vx2 and the +sine signal Vy1 are abnormal (S124: YES), the pre-correction angle θ7 is calculated based on the +cosine signal Vx1 and the −sine signal Vy2 (S125). The pre-correction rotation angle θ7 is corrected based on the phase correction value φ7, which is calculated based on the +cosine signal Vx1 and the −sine signal Vy2. The rotation angle δ of the detection object 87 is thus calculated (S126). If both the −cosine signal Vx2 and the −sine signal Vy2 are abnormal (S127: YES), the pre-correction angle θ8 is calculated based on the +cosine signal Vx1 and the +sine signal Vy1 (S128). The pre-correction rotation angle θ8 is corrected based on the phase correction value φ8, which is calculated based on the +cosine signal Vx1 and the +sine signal Vy1. The rotation angle δ of the detection object 87 is thus calculated (S129). Thus, even if the +cosine signal Vx1 or the −cosine signal Vx2 is abnormal, and the +sine signal Vy1 or the −sine signal Vy2 is abnormal, the rotation angle δ of the detection target 87 is calculated with high accuracy based on the pre-correction rotation angle and the phase correction value, which are calculated based on the normal signals, that is, either one of the +cosine signal and the −cosine signal and either one of the +sine signal Vy1 and the −sine signal Vy2.

According to the present embodiment, the pre-correction rotation angle θ is calculated as follows assuming that the rotation angle and the phase deviation of the detection target 87 are δ and α, respectively.

$$\theta = \delta + 45 + \alpha/2$$

The phase correction value φ is calculated as follows.

$$\phi = 45 + \alpha/2$$

Thus, by subtracting the phase correction value φ from the pre-correction rotation angle θ, the rotation angle δ of the detection object 87 is calculated by a simple equation. Since the phase correction value φ is a constant, it is stored in the memory circuit 52 in a reduced number of storage areas in comparison to a case that the phase correction value is a function.

The rotation angle detection device 10 is used in the electric power steering apparatus 1. The rotation angle of the motor 80 in the electric power steering apparatus 1 is thus calculated with high accuracy, and hence driving of the electric power steering apparatus 1 is controlled accurately. Even if the output signals Vx1, Vx2, Vy1 and Vy2 are abnormal, the rotation angle is calculated precisely by correcting phase deviations among the output signals and driving of the power steering apparatus 1 is continued.

The control circuit 51 operates as an output signal acquisition section, a pre-correction rotation angle calculation section, a phase correction value calculation section and a correction section. The memory circuit 52 operates as a memory section. S11 in FIG. 5 and S101 in FIG. 6 correspond to a function of the output signal acquisition section. S104, S107, S110, S113, S116 in FIG. 6 and S119, S122, S125, S129 in FIG. 7 correspond to a function of the pre-correction rotation angle calculation section. S12 in FIG. 5 corresponds to the phase correction value calculation section. S105, S108, S111, S114, S117 in FIG. 6 and S120, S123, S126 and S129 in FIG. 7 correspond to a function of the correction section.

(Other Embodiment)

(A) According to the present embodiment, if only the +cosine signal Vx1 is abnormal (S106: YES), the rotation angle δ is calculated based on the pre-correction rotation angle θ1 and the phase correction value φ1. However, the rotation angle δ may be calculated based on the pre-correction rotation angle θ5 and the phase correction value φ5, which are calculated based on the −cosine signal Vx2 and the −sine signal Vy2. Alternatively, the rotation angle δ may be calculated based on the pre-correction rotation angle θ6 and the phase correction value φ6, which are calculated based on the −cosine signal Vx2 and the +sine signal Vy1. Similarly, if only the −cosine signal Vx2 is abnormal (S109: YES), the rotation angle δ may be calculated based on the pre-correction rotation angle θ7 and the phase correction value φ7, which are calculated based on the +cosine signal Vx1 and the −sine signal Vy2. Alternatively, the rotation angle δ may be calculated based on the pre-correction rotation angle θ8 and the phase correction value φ8, which are calculated based on the +cosine signal Vx1 and the +sine signal Vy1. That is, if either the +cosine signal or the −cosine signal is abnormal, the pre-correction rotation angle and the phase correction angle may be calculated based on two normal signals. One normal signal is the +sine signal, the −sine signal or the +sine signal and the −sine signal. The other normal signal is the normal one of the +cosine signal and the −cosine signal. The rotation angle of the detection target is calculated based on the calculated pre-correction rotation angle and the phase correction value.

If only the +sine signal Vy1 is abnormal (S112: YES), the rotation angle δ may be calculated based on the pre-correction rotation angle θ5 and the phase correction value φ5, which are calculated based on the −cosine signal Vx2 and the −sine signal Vy2. Alternatively, the rotation angle δ may be calculated based on the pre-correction rotation angle θ7 and the phase correction value φ7, which are calculated based on the +cosine signal Vx1 and the −sine signal Vy2. Similarly, if only the −sine signal Vy2 is abnormal (S115: YES), the rotation angle δ may be calculated based on the pre-correction rotation angle θ6 and the phase correction value φ6, which are calculated based on the −cosine signal Vx2 and the +sine signal Vy1. Alternatively, the rotation angle δ may be calculated based on the pre-correction rotation angle θ8 and the phase correction value φ8, which are calculated based on the +cosine signal Vx1 and the +sine signal Vy1. That is, if either the +sine signal or the −sine signal is abnormal, the pre-correction rotation angle and the phase correction angle may be calculated based on two normal signals. One normal signal is the +cosine signal, the −cosine signal or the +cosine signal and the −cosine signal. The other normal signal is the normal one of the +cosine signal and the −cosine signal. The rotation angle of the detection target is calculated based on the calculated pre-correction rotation angle and the phase correction value.

According to the present embodiment, if all the cosine signals and the sine signals are normal, the pre-correction rotation angle and the phase correction angle are calculated based on the cosine signal acquired by subtraction between the cosine signals and the sine signal acquired by subtraction between the sine signals. However, if all the cosine signals and the sine signals are normal, the pre-correction rotation angle and the phase correction value may be calculated by any combination of the cosine signal and the sine signal. The pre-correction rotation angle and the phase correction value may be calculated in other methods.

(B) According to the present embodiment, the phase correction value is calculated to correct the phase deviation relative to the cosine signal as the reference. However, the phase correction value may be calculated to correct the phase deviation relative to the sine signal as the reference. The output signals are not limited to the cosine signal and the sine signal, but may be a plurality of output signals which are different in phase. In this case, one output signal may be set as the reference signal and the phase correction value may be calculated to correct the phase deviation of other signals relative to the reference signal.

(C) According to the present embodiment, the amplitudes of the cosine signal and the sine signal are 1 and the offset values added to the amplifier circuit 40 are 2.5. However, the amplitudes and the offset values may be set to other values as far as the microcomputer 50 can acquire them. According to the present embodiment, the +cosine signal, the −cosine signal, the +sine signal and the −sine signal have the same amplitude. However, the amplitudes may be different among the output signals. In this instance, the amplitudes may be corrected by the control circuit 51 as far as the respective amplitudes are known and the pre-correction rotation angle and the phase correction value may be calculated to calculate the rotation angle of the detection target in the similar manner as the present embodiment.

(D) According to the present embodiment, the amplifier circuit 40 is provided. However, the output signals of the half-bridges may be inputted to the microcomputer 50 without the amplifier circuit 40.

(E) According to the present embodiment, two bridge circuits are connected to different power sources respectively. However, both of the bridge circuits may be connected to the same power source. The output signals produced from one bridge circuit may be the +cosine signal and the −cosine signal, and the output signals produced from the other bridge circuit may be the +sine signal and the −sine signal.

(F) According to the present embodiment, two bridge circuits are provided. However, the number of the bridge circuits may be one, three or more. The number of the output signals produced from the half-bridges and inputted to the microcomputer may be other than four as far as at least two output signals of different phases are produced. A plurality of output signals may be produced from one half-bridge.

(G) According to the present embodiment, the rotation angle detection device is provided in the electric power steering apparatus. However, the rotation angle detection device may be used in other fields.

The present invention is not limited to the above-described embodiment and modifications.

What is claimed is:
1. A rotation angle detection device comprising:
  a sensor section including a plurality of sensor element pairs, each of which is formed of sensor elements and senses a rotating magnetic field varying with rotation of a detection target and changes impedance in accordance with a rotation angle of the detection target;
  an output signal acquisition section for acquiring output signals produced by the plurality of sensor element pairs individually;
  a pre-correction rotation angle calculation section for calculating a pre-correction rotation angle of the detection target based on the output signals acquired by the output signal acquisition section;
  a phase correction value calculation section for calculating phase correction values for correcting phase deviations between the output signals based on the output signals acquired by the output signal acquisition section;
  a memory section for storing the correction values calculated by the phase correction value calculation section; and
  a correction section for acquiring the phase correction values stored in the memory section and correcting the pre-correction rotation angle calculated by the pre-correction rotation angle calculation section by acquired phase correction values, wherein the output signal acquisition section acquires, as the output signals, a cosine signal and a sine signal, which are a plurality of signals of different phases, wherein the phase correction value calculation section calculates the phase correction values based on an addition value of the cosine signal and the sine signal and a subtraction value of the cosine signal and the sine signal; and wherein the phase correction value calculation section calculates the addition value by adding the cosine signal and sine signal and calculates the subtraction value by subtracting the sine signal from the cosine signal.

2. The rotation angle detection device according to claim 1, wherein:

the output signal acquisition section acquires four or more signals of the sensor section as the output signals.

3. The rotation angle detection device according to claim 2, wherein:

the output signal acquisition section acquires, as the output signals, a +cosine signal, a −cosine signal, a +sine signal and a −sine signal.

4. The rotation angle detection device according to claim 3, wherein:

the pre-correction rotation angle calculation section calculates the pre-correction rotation angle based on the +cosine signal, the −cosine signal, the +sine signal and the −sine signal; and the phase correction value calculation section calculates the phase correction value based on the +cosine signal, the −cosine signal, the +sine signal and the −sine signal.

5. The rotation angle detection device according to claim 3, wherein:

the pre-correction rotation angle calculation section calculates the pre-correction rotation angle based on the +cosine signal or the −cosine signal; and the phase correction value calculation section calculates the phase correction value based on the +cosine signal or the −cosine signal.

6. The rotation angle detection device according to claim 3, wherein:

the pre-correction rotation angle calculation section calculates the pre-correction rotation angle based on the +sine signal or the −sine signal; and the phase correction value calculation section calculates the phase correction value based on the +sine signal or the −sine signal.

7. An electric power steering apparatus comprising:
the rotation angle detection device according to claim 1.

* * * * *